(12) United States Patent
Brakefield

(10) Patent No.: US 12,413,419 B1
(45) Date of Patent: Sep. 9, 2025

(54) SYSTEM AND METHOD FOR EVALUATING COMPUTER PROGRAM HALTS

(71) Applicant: Howard Christopher Brakefield, Mountain Brook, AL (US)

(72) Inventor: Howard Christopher Brakefield, Mountain Brook, AL (US)

( * ) Notice: Subject to any disclaimer, the term of this patent is extended or adjusted under 35 U.S.C. 154(b) by 0 days.

(21) Appl. No.: 18/914,475

(22) Filed: Oct. 14, 2024

(51) Int. Cl.
*H04L 9/40* (2022.01)
*H04L 9/32* (2006.01)

(52) U.S. Cl.
CPC .................................. *H04L 9/3247* (2013.01)

(58) Field of Classification Search
CPC ...................................................... H04L 9/3247
See application file for complete search history.

(56) References Cited

U.S. PATENT DOCUMENTS

| | | | |
|---|---|---|---|
| 4,156,929 A | 5/1979 | Eichenlaub et al. | |
| 6,434,738 B1 | 8/2002 | Arnow | |
| 10,797,686 B1* | 10/2020 | Terstrup | H04L 7/0012 |
| 2006/0294588 A1* | 12/2006 | Lahann | G06F 21/56 726/11 |
| 2013/0305030 A1 | 11/2013 | Chen et al. | |
| 2014/0162780 A1* | 6/2014 | Suzuki | A63F 13/45 463/31 |
| 2015/0112746 A1* | 4/2015 | Wang | G06Q 10/109 705/7.18 |
| 2015/0193869 A1* | 7/2015 | Del Vecchio | G06Q 40/02 705/42 |
| 2017/0244745 A1* | 8/2017 | Key | H04L 63/1408 |
| 2018/0024543 A1* | 1/2018 | Kitamura | G06Q 10/06 700/44 |
| 2018/0246799 A1 | 8/2018 | Carey et al. | |
| 2022/0229430 A1* | 7/2022 | Balasubramanian | G05B 23/0245 |
| 2023/0319098 A1* | 10/2023 | Berlin | G06N 5/022 726/24 |
| 2024/0411354 A1* | 12/2024 | Satsangi | G06F 1/3296 |

FOREIGN PATENT DOCUMENTS

| | | |
|---|---|---|
| CN | 1235142 C | 1/2006 |
| CN | 1811730 A | 8/2006 |
| CN | 102495793 A | 6/2012 |
| CN | 103164332 A | 6/2013 |
| CN | 102622300 A | 3/2015 |
| JP | 2010182218 A | 8/2010 |
| TW | I643063 B | 12/2018 |

* cited by examiner

*Primary Examiner* — Ghodrat Jamshidi
(74) *Attorney, Agent, or Firm* — John Rizvi; John Rizvi, P.A.—The Patent Professor®

(57) ABSTRACT

A method includes initiating a first graph clock to track events occurring in a program executing on a computer device. The first graph clock includes a circular counter with a tick location representing a 24-hour period and one or more colored waveforms encircling the circular counter. The method includes detecting a first event occurring in a program executing on a computer device, The method includes determining a first tick location on the first graph clock. Additionally, the method includes recording, as a digital signature, the one or more color waveforms that correspond to the first tick location.

16 Claims, 8 Drawing Sheets

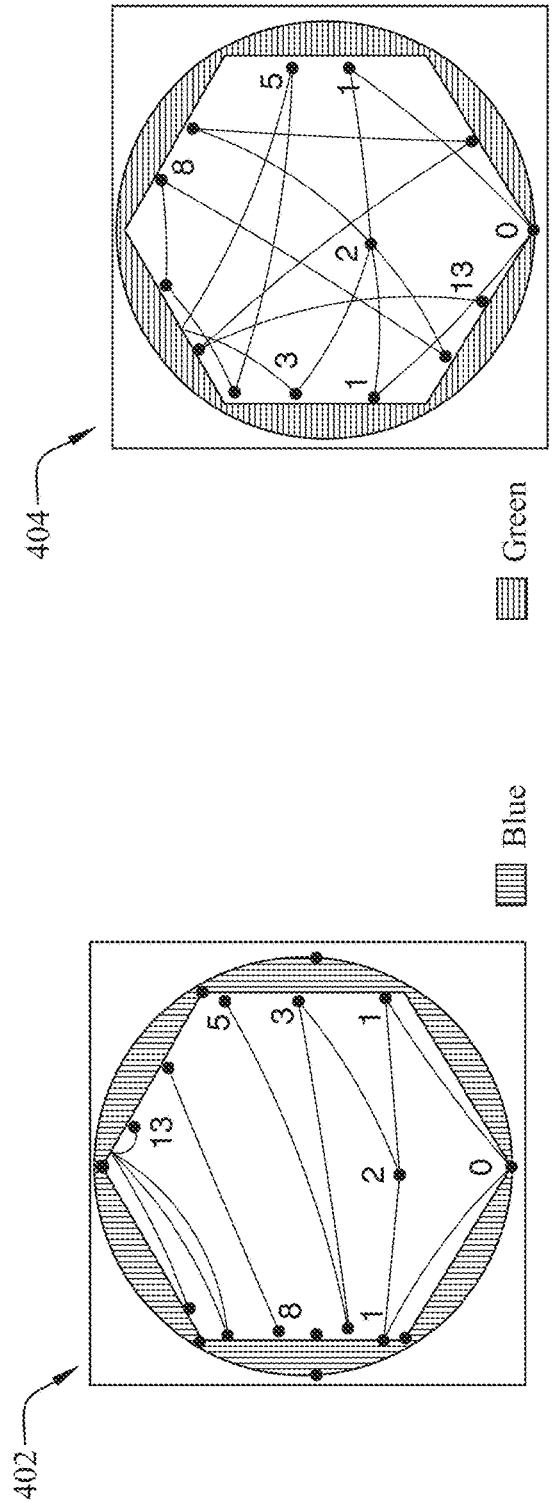
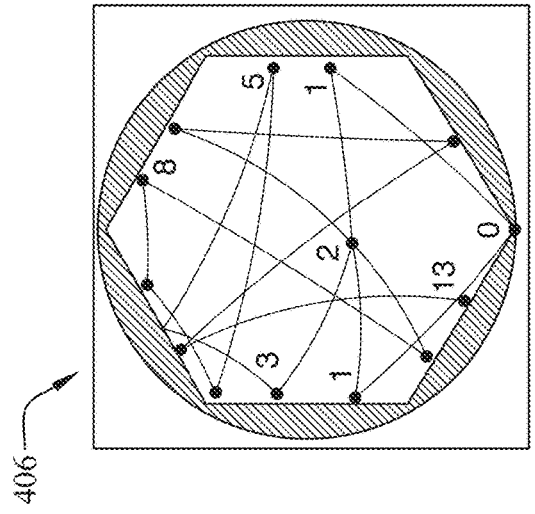
FIG. 4A
FIG. 4B
FIG. 4C

SYSTEM AND METHOD FOR EVALUATING COMPUTER PROGRAM HALTS

FIELD OF THE INVENTION

The present invention relates generally to computer security.

BACKGROUND OF THE INVENTION

Computer security is paramount in the modern world based on the wide spread use of computer devices in every aspect of daily life. One type of attack that the performed by malicious actors is a spoofing attack. In a spoofing attack, an attacker pretends to be a trusted source in order to deceive a victim or system. The goal is typically to gain unauthorized access to data, steal sensitive information, or disrupt normal network operations.

Accordingly, there is need for a solution to at least one of the aforementioned problems. For instance, there is an established need for security systems and methods that address the above drawback.

SUMMARY OF THE INVENTION

The present invention is directed to a method that includes initiating a first graph clock to track events occurring in a program executing on a computer device. The first graph clock includes a circular counter with a tick location representing a 24-hour period and one or more colored waveforms encircling the circular counter. The method includes detecting a first event occurring in a program executing on a computer device. The method includes determining a first tick location on the first graph clock. Additionally, the method includes recording, as a digital signature, the one or more color waveforms that correspond to the first tick location.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIGS. 3, 4A-4C, and FIGS. 5A-5C present diagrams of a graph clocks in accordance with a first illustrative embodiment of the present invention.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a method and system for determining computer halts.

Figure 1:
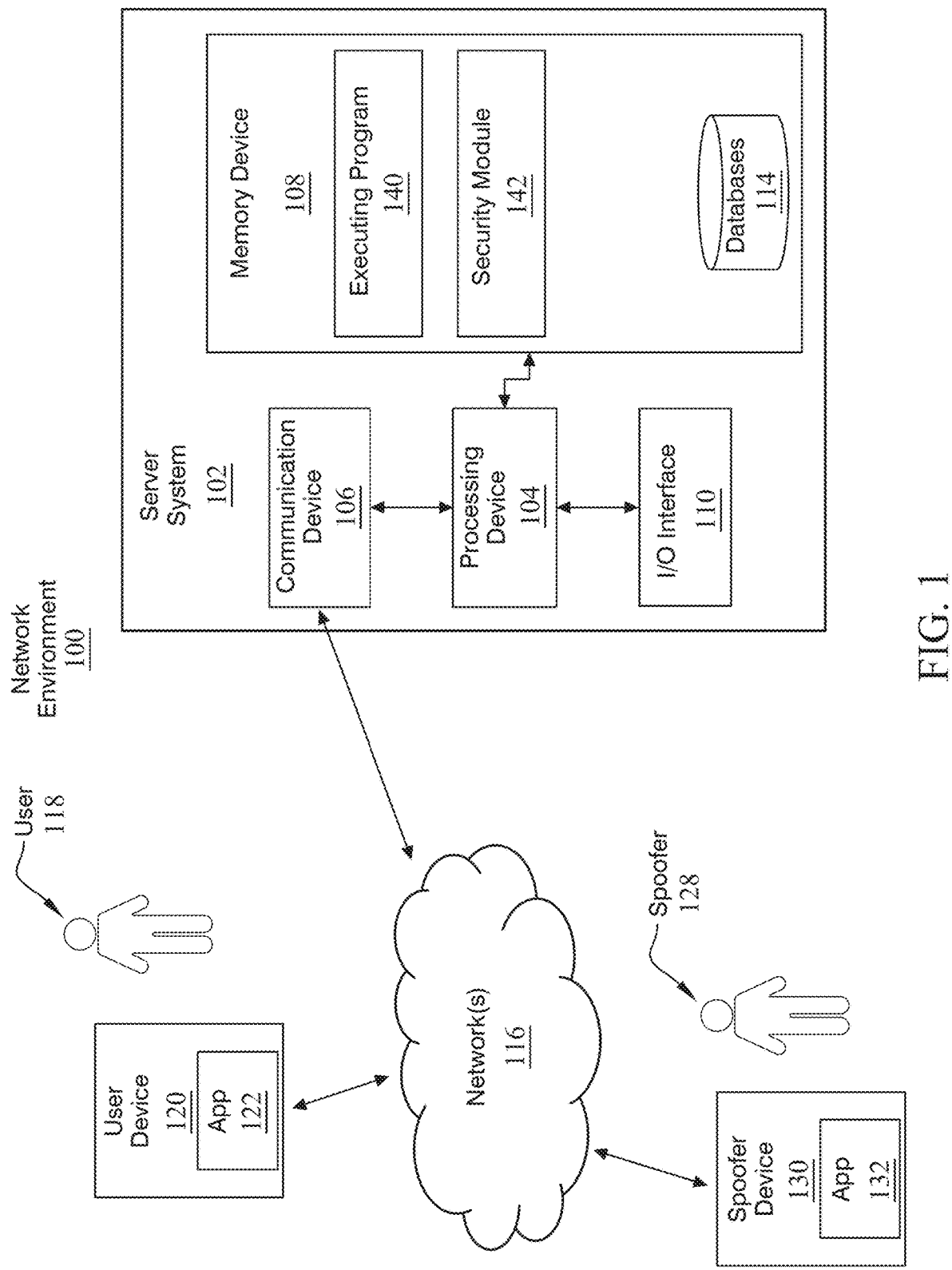
FIG. 1 presents an environment for detecting spoofing attacks in accordance with a first illustrative embodiments of the present invention.

Referring initially to FIGS. 1, 2A, 2B, 3, 4A-4C, 5A-5C, and 6, FIG. 1 illustrates a network environment 100 in which a security system and method can be performed, according to aspects of the present disclosure. While FIG. 1 illustrates examples of components of network environment, additional components can be added and existing components can be removed and/or modified.

As illustrated in FIG. 1, a server system 102 includes a processing device 104 coupled to a communication device 106. The processing device 104 is also coupled to a memory device 108, and an input/output ("I/O") interface 110. In embodiments, the communication interface 106 enables the server 102 to communicate with other devices and systems via one or more networks 116. The server system 102 can communicate with a user 118, operating a user device 120, via the network 116. The user device 120 can include one or more electronic devices such as a laptop computer, a desktop computer, a tablet computer, a smartphone, a thin client, and the like. The user device 120 can store and execute a copy of an application 122. The application 122 enables the user 118 operating the user device 120, to communicate and interact with the sever system 102. In some embodiments, the application 122 can be a specifically designed application that operates with the system 102 to perform the processes and methods described herein. In some embodiments, the application 122 can be a third-party application, such as a web browser, that communicates with the server system 102 to perform the processes and methods described herein.

In embodiments, one or more malicious actors may desire to perform attacks on the server system 102, an executing program 140 running on the server system 102, and our the user device 120. For example, a spoofing 128, using a spoofer device 130 and/or a hacking application 132, may attempt to attack may desire to perform attacks on the server system 102, an executing program 140 running on the server system 102, and/or the user device 120. To protect systems from attach, the server system 102 can store and execute a security module 142. The security module 140 can be stored in the memory device 108. The security module 140 can include the necessary logic, instructions, and/or programming to perform the processes and methods described herein. The security module 140 can be written in any programming language.

Figure 2A:
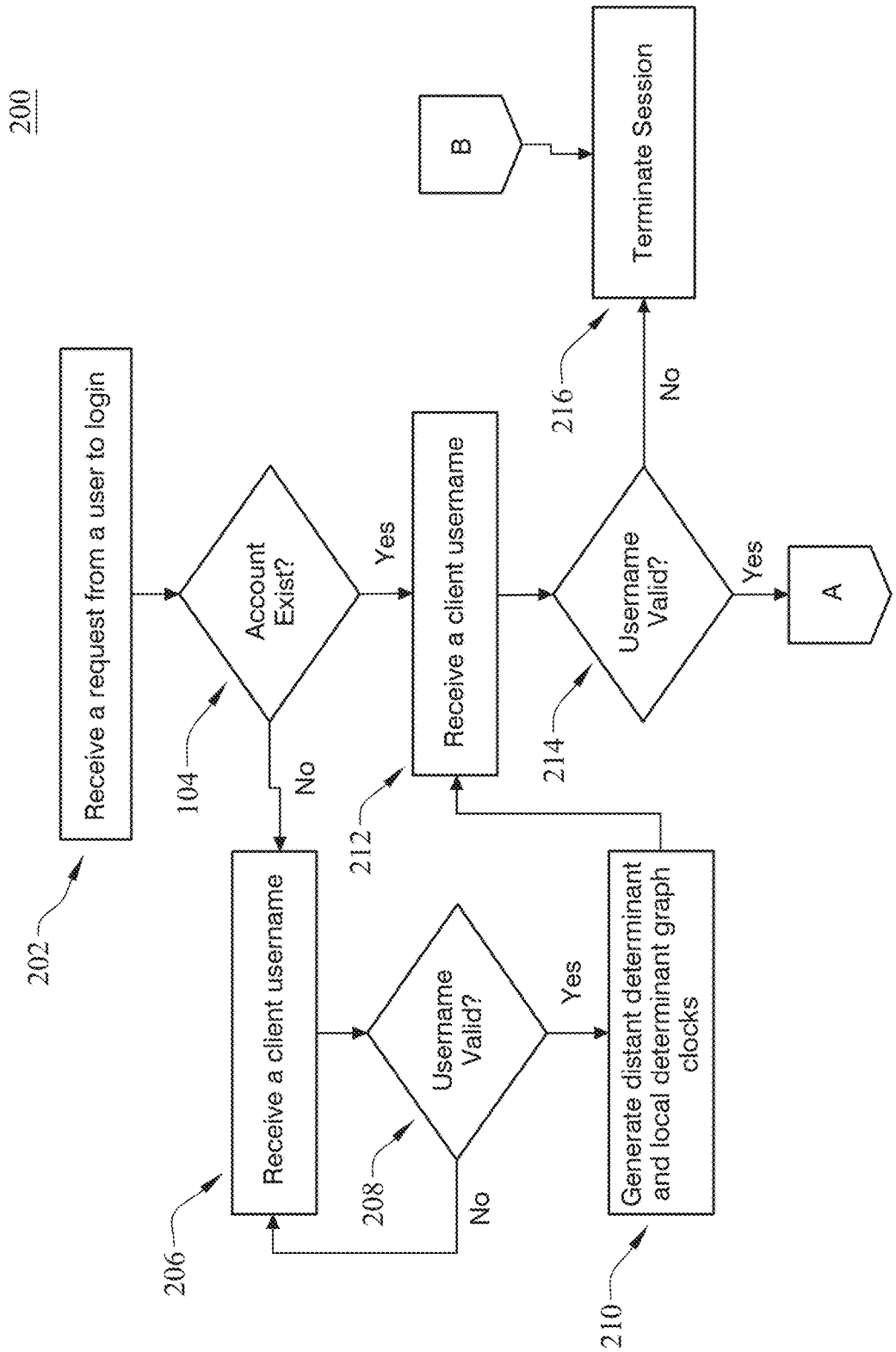
FIGS. 2A and 2B present a flow chart of a security process in accordance with a first illustrative embodiment of the present invention.
Figure 2B:
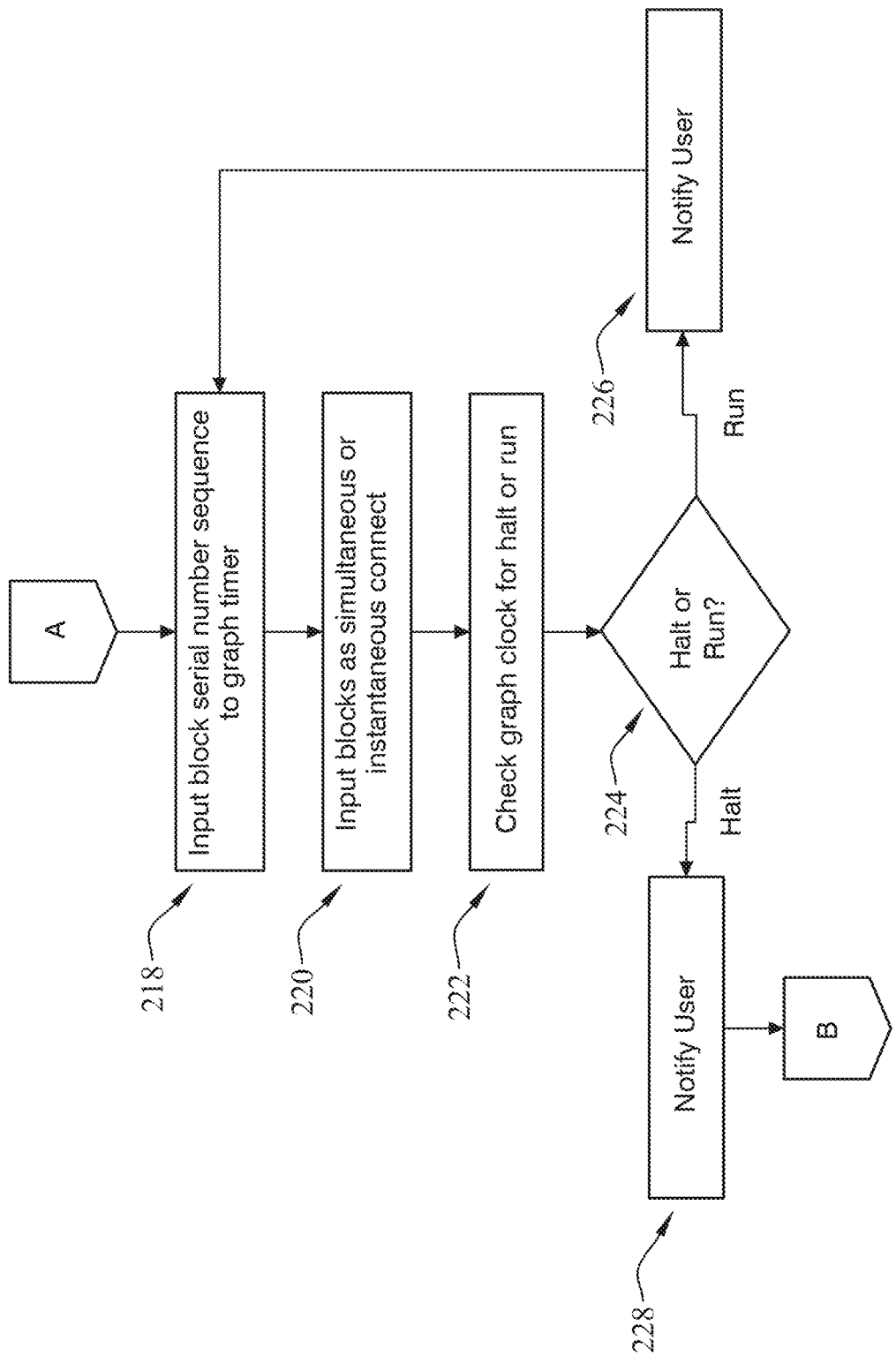

In embodiments, the security module 140 can be configured to perform a security method to track "events" and provide digital "signature" using one or more graph clocks. FIGS. 2A and 2B show a security method for determining computer halts, hereinafter method 100, is illustrated in accordance with a first exemplary embodiment of the present invention.

Method 100 begins in stage 102, where a user requests login to a business process. For example, a user, e.g., the user 118 using the user device 120, can be an employee of a business and desire to access a computer program or process, e.g., the executing program 140 running on the server system 102. In another example, the user, e.g., the user 118 using the user device 120, can be a consumer attempting to use a computer process, e.g., the executing program 140 running on the server system 102, such as a banking application, a social media application, and the like.

In stage 104, it can be determined if an account exists for the user. If an account does not exist for a user, in 106, a new username can be received from the user. In 108, it can be determined if the new username is valid. For example, it can be determined if the username has been previously used and/or conforms with the requirement for a username. Additionally, the user can provide login credentials such as a password, biometric information, etc.

If the username is not valid, the method 100 can return and the user can provide a different username. If the username is valid, in 110, a distant determinant and local determinant graph clock can be generated for the user. As described herein, a graph clock is a timer that tracks logins and/or access attempts for a computer process to determine whether the computer process should be halted. FIGS. 2, 3A-3C, and FIG. 4A-4C illustrate examples of graph clocks in accordance with embodiments of the present disclosure. The graph clocks provide correlation, determination, and polarization, for example, by means of two red local "control determinant blocks, which may never move from their position at the apex of the clock.

For example, a red local "control" determinant block has a color "white" in its circle and color red outside of its circle. There can be two of these at 0000 hours on the clock and 2400 hours of the clock, e.g., the apex of the clock. This position on the clock represents the beginning of a day and the end of a day, which happens "instantaneously." User command is at this proximity and is for on (run) or off (halt). This apex of the clock is the only proximity that is instantaneous. As the clock ticks over a 24-hour period, the white distant determinant blocks, colored blue or green, the user command for On (run) or Off (Halt) happened simultaneously, so the computer program does not happen instantaneously in command.

Figure 3:
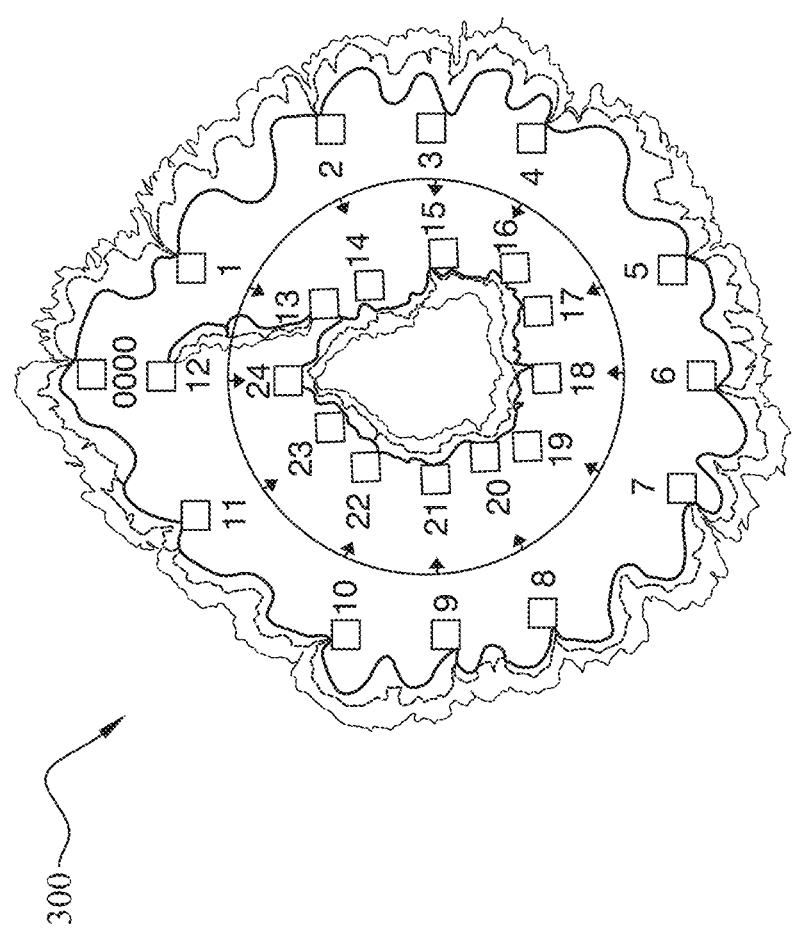

As illustrated in FIG. 3, the graph clock 200 is represented as an analog clock with corresponding color waveforms. In the graph clock 200, the red wavelength is longer than the green wavelength, and the green wavelength is longer than the blue wavelength. The color waveforms provide a signature that allows the security module 142 to determine if events at the executing program 140 are authentic or potentially malicious, e.g., a spoofing attack. The waveforms function to attribute an ID and evidence of a command to halt or run. For example, the 24-hour clock has an electrical signal that generates an oscillating tick, or seconds tick, which utilizes a counter mechanism that can accurately give a measurement update. The clock can display the time an operation takes place in a halt or run in the computer program, e.g., the executing program 140 running on the server system 102. An addition of one second to the counter results in a 24 hour clock to display the time.

As illustrated in FIGS. 4A-4C, the graph clock can be represented by a hexagon embedded within a circle. A graph having 13 nodes is plotted within the hexagon, where each node lies on the edge of the hexagon or at an intersection of the graph. As illustrated, there can be three clocks: a graph clock 402, a graph clock 404, and a graph clock 406, each represented by a different color.

The 24-hour clock provides the user with a more accurate measurement update than a 12-hour clock since a 24-hour clock does not use AM or PM. The 24 hour clock utilizes 4 digits of significance, e.g., 0000 hour, 1200 hour, and 2400 hour. The first two digits are for the hour and second two digits are for minutes. In some embodiments, the nodes in the graph clocks can represent the server, the routers, the end user device, etc., all connectors to a connection point. In this application, point-of view of the block are uniform so the node connection for each block is uniform.

Figure 5A:
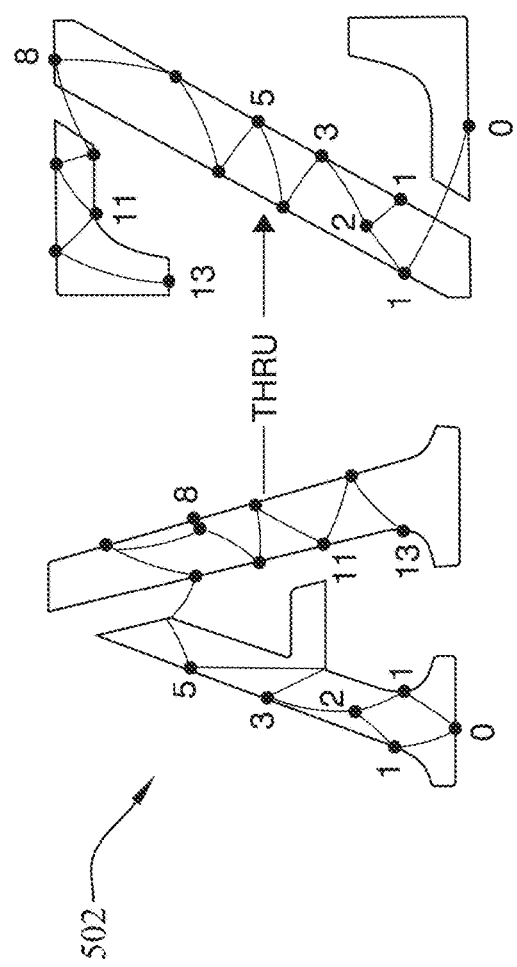
Figure 5B:
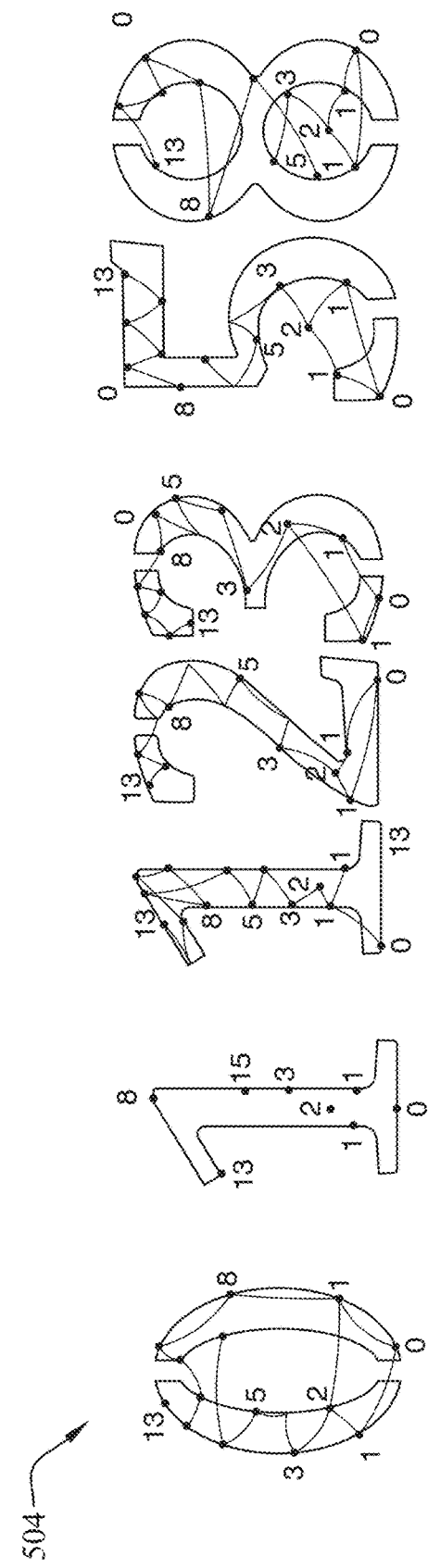
Figure 5C:
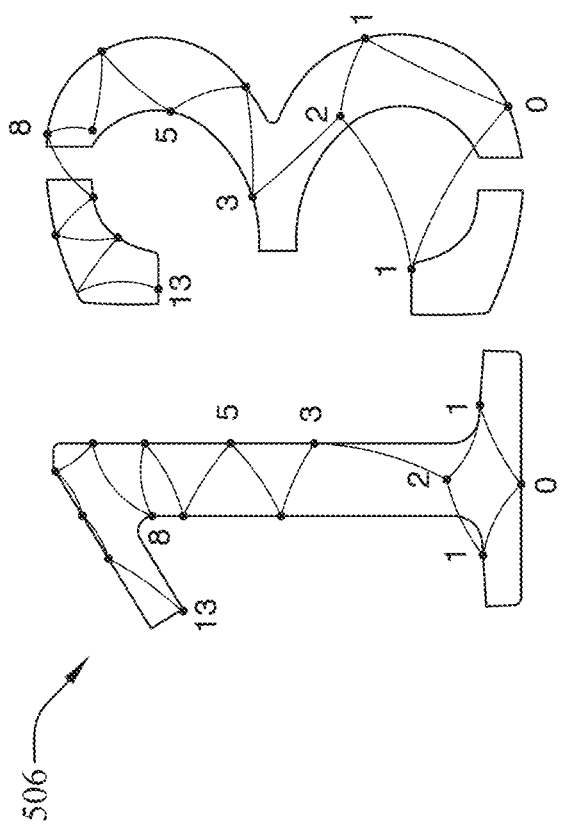

As illustrated in FIGS. 5A-5C, the graph clock can be represented by alpha numeric characters containing a graph. A graph having 13 nodes is plotted within each of the alpha numeric characters containing a graph, where each node lies on the edge of the hexagon or at an intersection of the graph. As illustrated, there can be three clocks: a graph clock 402, a graph clock 404, and a graph clock 406, each represented by a different color. For example, graph clock 402 can be the letters A-Z with a graph plotted within each letter. Graph clock 404 can be a number series, e.g., a Fibonacci series, with a graph plotted within each number. Graph clock 406 can be single number, e.g., 13, with a graph plotted within the number. The alphanumeric code is another ID form for "signatures" that accurately identify users and data. Numeric strings in hexagon represented as: 0, 1, 1, 2, 3, 5, 8, 13, represent each following number added in conjunction with the two preceding numbers ending with the numeral thirteen.

After the graph clock is generated, the method 100 can proceed to stage 112. In stage 112, the username and credentials of a user can be received and validated in stage 114. If the username and credentials are not valid, in 116, the process can terminate.

If the username and credentials are valid, the method can proceed to stage 118. A block serial number sequence is input to the graph timer. In stage 220, the input block connects as simultaneous or instantaneous. In stage 222, the graph clock can be checked for a haft or run and the user can be notified in stage 226 or 228.

For example, each color wavelength is a digital "signature", and the blue wavelength connects via nodes and represents an even hour or Off/halt, and the green wavelength connects via nodes and represents an odd hour for On/Run. The user checks the computer "counter of seconds/ticks and take a "measurement update", where the program halts or runs. The 24 hour clock is an international time standard for a time format when a 24 hour day begins and when it ends. Each "signature" in this application has a real-time stamp for log-in, log-out, halt/urn, on/off, etc.

Figure 6:
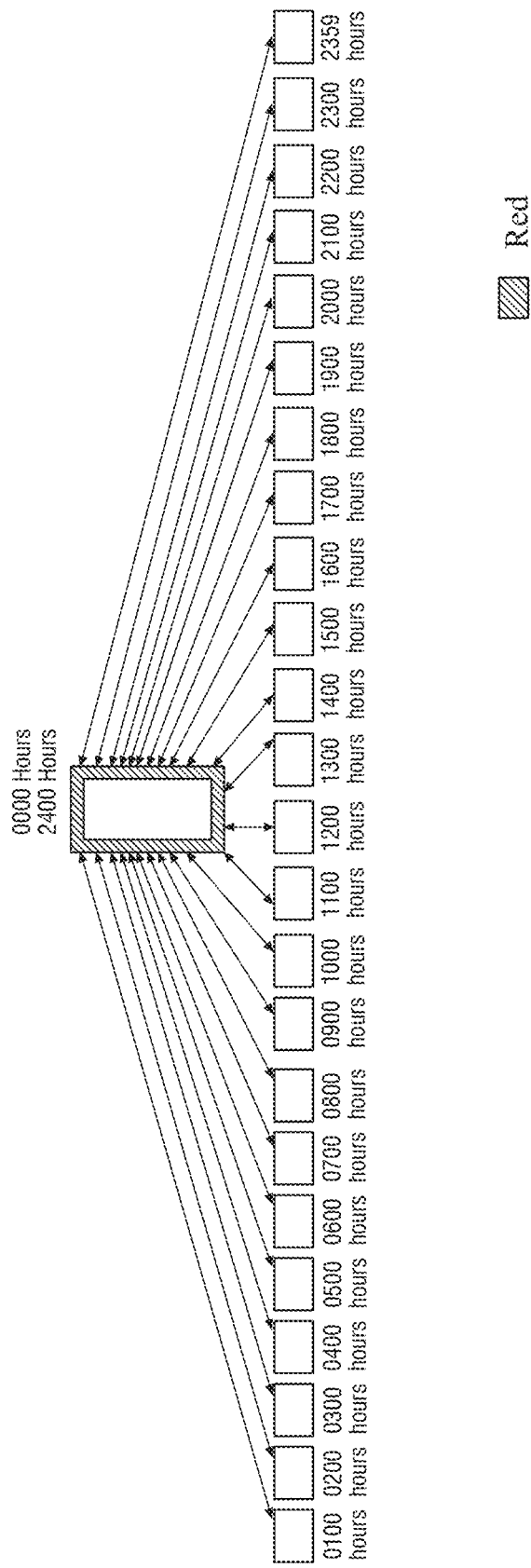
FIG. 6 presents a diagram of a red determinate block of the graph clocks in accordance with a first illustrative embodiment of the present invention.

As illustrated in FIGS. 3 and 6, the graph clock 300 runs as a continuous function of actual time. The security module 142 checks for events; for example, processes running in the cloud can be checked. The security module 142 can be checked for patterns in operation and attacks, e.g., spoofing.

As illustrated in FIG. 6, all blocks associated with time blocks are identical in shape. A red local "control" determinate block 600 correlates which color, e.g., green and blue, results in a Halt or Run in a computer program. Distant determinant blocks communicate information back to the red local determinate block 600, which is taking/recording measurements. Time ticks on the 24 hour graph clock, e.g., graph clock 300, are continuous without interruption. The green and blue blocks and the alphanumeric code used in logins, logouts, and commends of runs/halts can only be executed if "measurement updates" are taken to validate and verify monitoring the system of controls.

Returning to FIG. 1, the processing device 104, the communication device 106, the memory device 108, and the I/O interface 110 can be interconnected via a system bus. The system bus can be and/or include a control bus, a data bus, an address bus, and the like. The processing device 104 can be and/or include a processor, a microprocessor, a computer processing unit ("CPU"), a graphics processing unit ("GPU"), a neural processing unit, a physics processing unit, a digital signal processor, an image signal processor, a synergistic processing element, a field-programmable gate array ("FPGA"), a sound chip, a multi-core processor, and the like. As used herein, "processor," "processing component," "processing device," and/or "processing unit" can be used generically to refer to any or all of the aforementioned specific devices, elements, and/or features of the processing device. While FIG. 1 illustrates a single processing device 104, the server system 102 can include multiple processing devices 104, whether the same type or different types.

The memory device 108 can be and/or include one or more computerized storage media capable of storing electronic data temporarily, semi-permanently, or permanently. The memory device 108 can be or include a computer processing unit register, a cache memory, a magnetic disk, an optical disk, a solid-state drive, and the like. The memory device can be and/or include random access memory ("RAM"), read-only memory ("ROM"), static RAM, dynamic RAM, masked ROM, programmable ROM, erasable and programmable ROM, electrically erasable and programmable ROM, and so forth. As used herein, "memory," "memory component," "memory device," and/or "memory unit" can be used generically to refer to any or all of the aforementioned specific devices, elements, and/or features of the memory device 108. While FIG. 1 illustrates a single memory device 108, the server system 102 can include multiple memory devices 108, whether the same type or different types.

The communication device 104 enables the server system 102 to communicate with other devices and systems. The communication device 104 can include hardware and/or software for generating and communicating signals over a direct and/or indirect network communication link. As used herein, a direct link can include a link between two devices where information is communicated from one device to the other without passing through an intermediary. For example, the direct link can include a Bluetooth™ connection, a Zigbee connection, a Wifi Direct™ connection, a near-field communications ("NFC") connection, an infrared connection, a wired universal serial bus ("USB") connection, an ethernet cable connection, a fiber-optic connection, a firewire connection, a microwire connection, and so forth. In another example, the direct link can include a cable on a bus network, programming installed on a processor, such as the processing component, coupled to the antenna.

An indirect link can include a link between two or more devices where data can pass through an intermediary, such as a router, before being received by an intended recipient of the data. For example, the indirect link can include a WiFi connection where data is passed through a WiFi router, a cellular network connection where data is passed through a cellular network router, a wired network connection where devices are interconnected through hubs and/or routers, and so forth. The cellular network connection can be implemented according to one or more cellular network standards, including the global system for mobile communications ("GSM") standard, a code division multiple access ("CDMA") standard such as the universal mobile telecommunications standard, an orthogonal frequency division multiple access ("OFDMA") standard such as the long term evolution ("LTE") standard, and so forth.

In embodiments, the components and functionality of the server system 102 can be hosted and/or instantiated on a "cloud" and/or "cloud service." As used herein, a "cloud" and/or "cloud service" can include a collection of computer resources that can be invoked to instantiate a virtual machine, application instance, process, data storage, or other resources for a limited or defined duration. The collection of resources supporting a cloud can include a set of computer hardware and software configured to deliver computing components needed to instantiate a virtual machine, application instance, process, data storage, or other resources. For example, one group of computer hardware and software can host and serve an operating system or components thereof to deliver to and instantiate a virtual machine. Another group of computer hardware and software can accept requests to host computing cycles or processor time, to supply a defined level of processing power for a virtual machine. A further group of computer hardware and software can host and serve applications to load on an instantiation of a virtual machine, such as an email client, a browser application, a messaging application, or other applications or software. Other types of computer hardware and software are possible.

In embodiments, the components and functionality of the server system 102 can be and/or include a "server" device. The term server can refer to functionality of a device and/or an application operating on a device. The server device can include a physical server, a virtual server, and/or cloud server. For example, the server device can include one or more bare-metal servers such as single-tenant servers or multiple-tenant servers. In another example, the server device can include a bare metal server partitioned into two or more virtual servers. The virtual servers can include separate operating systems and/or applications from each other. In yet another example, the server device can include a virtual server distributed on a cluster of networked physical servers. The virtual servers can include an operating system and/or one or more applications installed on the virtual server and distributed across the cluster of networked physical servers. In yet another example, the server device can include more than one virtual server distributed across a cluster of networked physical servers.

Various aspects of the systems described herein can be referred to as "content" and/or "data." Content and/or data can be used to refer generically to modes of storing and/or conveying information. Accordingly, data can refer to textual entries in a table of a database. Content and/or data can refer to alphanumeric characters stored in a database. Content and/or data can refer to machine-readable code. Content and/or data can refer to images. Content and/or data can refer to audio and/or video. Content and/or data can refer to, more broadly, a sequence of one or more symbols. The symbols can be binary. Content and/or data can refer to a machine state that is computer-readable. Content and/or data can refer to human-readable text.

In some embodiments the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method comprising:
    initiating a first graph clock to track events occurring in a program executing on a computer device, the first graph clock comprising:
        a circular counter with a tick location representing a 24-hour period; and
        one or more colored waveforms encircling the circular counter;
    detecting a first event occurring in the program executing on the computer device;
    determining a first tick location on the first graph clock;
    recording, as a digital signature, the one or more colored waveforms that correspond to the first tick location; and
    initiating one or more second graph clocks to track the events occurring in the program executing on the computer device, at least one of the one or more second graph clocks comprising:
        a first geometric shape embedded in a second geometric shape,
        a series of nodes positioned within the first geometric shape, and
        a line graph connecting the series of nodes;
    wherein one or more of the steps are performed by at least one processor coupled to memory.

2. The method of claim 1, wherein the one or more second graph clocks comprise a series of alpha-numeric shapes, each alpha-numeric shape comprising:
- a series of nodes positioned within the alpha-numeric shape, and
- a line graph connecting the series of nodes.

3. The method of claim 1, wherein the first event comprises a halt or run of the program executing on the computer device.

4. The method of claim 1 further including determining if the first event is authentic or malicious based on the digital signature.

5. A method, comprising:
- initiating a first graph clock to track events occurring in a program executing on a computer device, the first graph clock comprising:
  - a circular counter with a tick location representing a 24-hour period;
  - one or more colored waveforms encircling the circular counter;
- detecting a first event occurring in the program executing on the computer device;
- determining a first tick location on the first graph clock;
- recording, as a digital signature, the one or more colored waveforms that correspond to the first tick location; and
- determining if the first event is authentic or malicious based on the digital signature;
- wherein one or more of the steps are performed by at least one processor coupled to memory.

6. The method of claim 5, further comprising:
- initiating one or more second graph clocks to track the events in occurring in the program executing on the computer device, at least one of the one or more second graph clocks comprising:
  - a first geometric shape embedded in a second geometric shape,
  - a series of nodes positioned within the first geometric shape, and
  - a line graph connecting the series of nodes.

7. The method of claim 6, wherein the one or more second graph clocks comprise a series of alpha-numeric shapes, each alpha-numeric shape comprising:
- a series of nodes positioned within the alpha-numeric shape, and
- a line graph connecting the series of nodes.

8. The method of claim 5, wherein the first event comprises a halt or run of the program executing on the computer device.

9. A computer program product stored on a non-transitory computer-readable medium storing instructions that cause one or more processes to perform a method comprising:
- initiating a first graph clock to track events occurring in a program executing on a computer device, the first graph clock comprising:
  - a circular counter with a tick location representing a 24-hour period; and
  - one or more colored waveforms encircling the circular counter;
- detecting a first event occurring in the program executing on the computer device;
- determining a first tick location on the first graph clock;
- recording, as a digital signature, the one or more colored colored waveforms that correspond to the first tick location; and
- determining if the first event is authentic or malicious based on the digital signature.

10. The computer program product of claim 9, further comprising:
- initiating one or more second graph clocks to track the events in occurring in the program executing on the computer device, at least one of the one or more second graph clocks comprising:
  - a first geometric shape embedded in a second geometric shape,
  - a series of nodes positioned within the first geometric shape, and
  - a line graph connecting the series of nodes.

11. The computer program product of claim 10, wherein the one or more second graph clocks comprise a series of alpha-numeric shapes, each alpha-numeric shape comprising:
- a series of nodes positioned within the alpha-numeric shape, and
- a line graph connecting the series of nodes.

12. The computer program product of claim 9, wherein the first event comprises a halt or run of the program executing on the computer device.

13. A computer system comprising:
- a memory device storing instructions; and
- a processor coupled to the memory device and configured to execute the instructions to perform a method, the method comprising:
  - initiating a first graph clock to track events occurring in a program executing on a computer device, the first graph clock comprising:
    - a circular counter with a tick location representing a 24-hour period; and
    - one or more colored waveforms encircling the circular counter;
  - detecting a first event occurring in the program executing on the computer device;
  - determining a first tick location on the first graph clock;
  - recording, as a digital signature, the one or more colored waveforms that correspond to the first tick location; and
  - initiating one or more second graph clocks to track the events in occurring in the program executing on the computer device, at least one of the one or more second graph clocks comprising:
    - a first geometric shape embedded in a second geometric shape,
    - a series of nodes positioned within the first geometric shape, and
    - a line graph connecting the series of nodes.

14. The computer system of claim 13, wherein the one or more second graph clocks comprise a series of alpha-numeric shapes, each alpha-numeric shape comprising:
- a series of nodes positioned within the alpha-numeric shape, and
- a line graph connecting the series of nodes.

15. The computer system of claim 13, wherein the first event comprises a halt or run of the program executing on the computer device.

16. The computer system of claim 13, the method further comprising:
- determining if the first event is authentic or malicious based on the digital signature.

* * * * *